Figure 1:
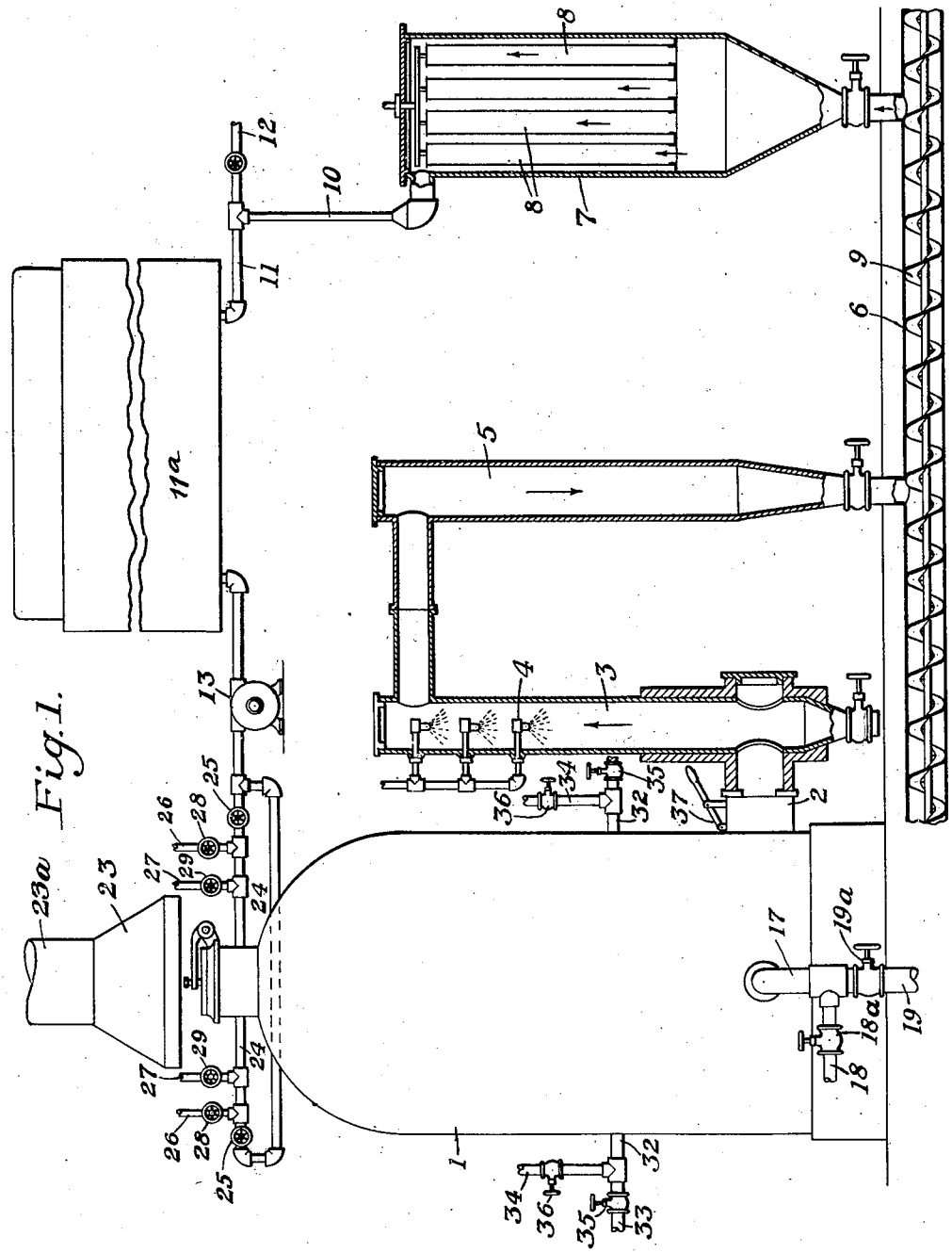

Jan. 15, 1935.  E. B. SPEAR ET AL  1,987,644
CARBON BLACK
Filed Feb. 4, 1933   2 Sheets-Sheet 1

INVENTORS
Elwood B. Spear & Robert L. Moore
By Francis M. Crawford
ATTORNEY

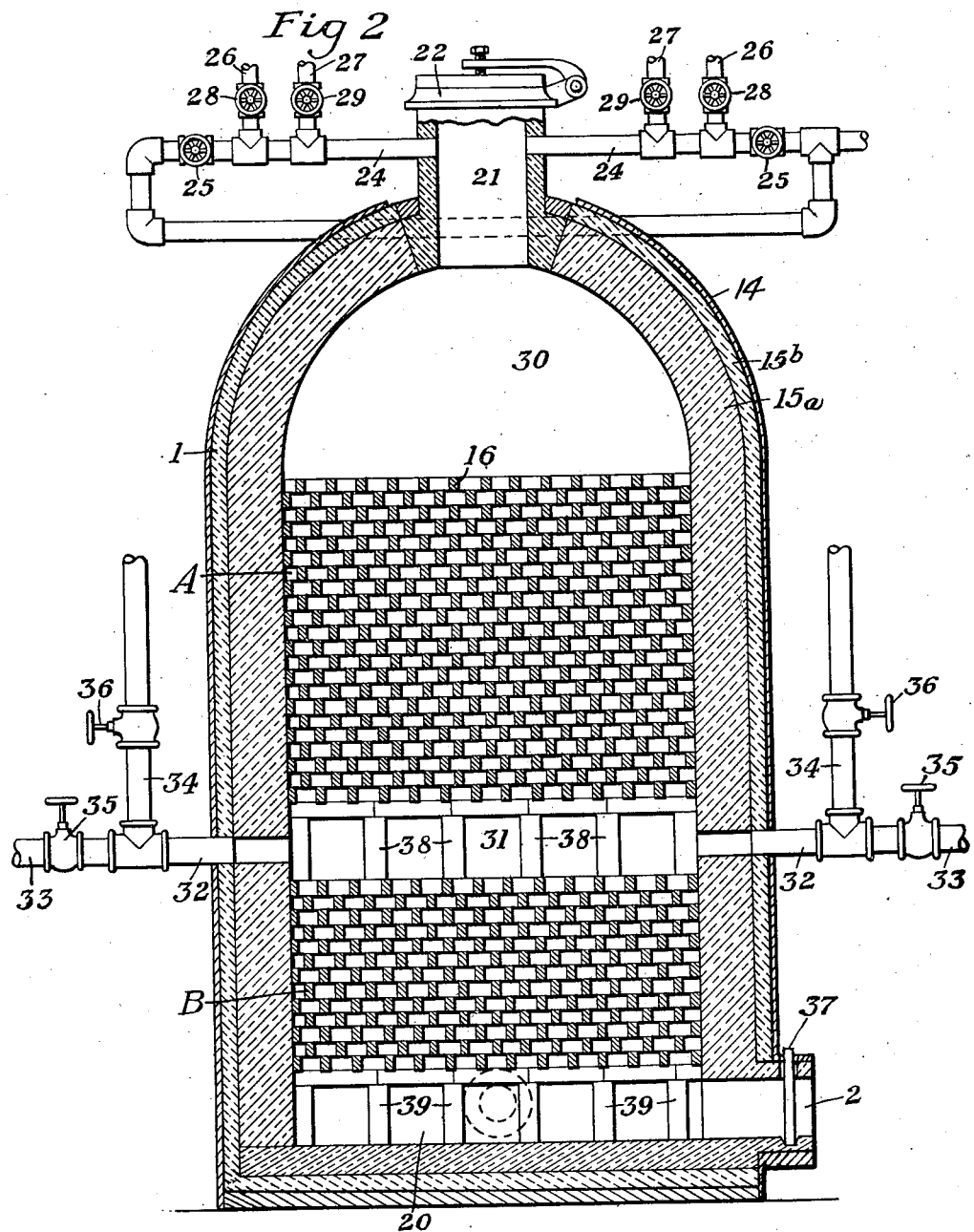

Patented Jan. 15, 1935

1,987,644

UNITED STATES PATENT OFFICE 1,987,644

CARBON BLACK

Ellwood B. Spear, Milford, N. H., and Robert L. Moore, Mount Lebanon, Pa., assignors to Thermatomic Carbon Company, New York, N. Y., a corporation of Delaware Application February 4, 1933, Serial No. 655,296
In Canada August 18, 1928

11 Claims. (Cl. 134—60)

This application is a continuation in part of our co-pending application Serial No. 484,578, filed September 26, 1930, which is a division of our co-pending Serial No. 300,132, filed August 16, 1928, as a continuation in part of our co-pending application Serial No. 61,149, filed October 7, 1925 now U. S. Patent No. 1,911,003, granted May 23, 1933, and Serial No. 206,500, filed July 18, 1927, now abandoned, and which related to the carbon of the present application and the method of producing same which comprised passing the mixture of hydrocarbon and inert diluent gases through highly heated refractory checkerwork.

The present invention relates to carbon black. This carbon black is a variation and an improvement in carbon blacks of the so-called thermal decomposition type. The thermal decomposition carbons differ from the common commercial carbon blacks in having markedly less rubber-stiffening qualities. The common commercial carbon blacks are ordinarily made by gas flames burning against cool metal surfaces upon which the carbon black is deposited and from which it is scraped. This process is commonly called the "channel" process, and these blacks are sometimes called "channel" blacks. The carbon blacks of the thermal decomposition type are usually made by decomposing the gas in a heated retort, as described for example, in the Brownlee and Uhlinger Patent No. 1,520,115 of December 23, 1924, or by variations of such process, such for example, as the process hereinafter described. The term thermal decomposition therefore applies to a plurality of carbon blacks and is the name of a type. One particular variety of thermal decomposition carbon black is that manufactured according to the process of the Brownlee and Uhlinger patent referred to above, and is known to the trade under its particular registered trade-mark. The thermal decomposition carbon black as made by the process hereinafter described is likewise known to the trade by its registered trade-mark, but it will be referred to herein merely as "our carbon black" or "our new carbon black".

The characteristics of the thermal decomposition carbon black as made commercially by the Brownlee and Uhlinger process, (the carbon black referred to herein as the "Brownlee and Uhlinger carbon black") and particularly its characteristics in rubber compounding, are described in the patent to Roy H. Uhlinger, No. 1,638,421, dated August 9, 1927. These characteristics, and particularly the rubber-stiffening qualities, differ somewhat from those described in the Brownlee and Uhlinger Patent No. 1,478,730, dated December 25, 1923, as it has been found that the carbon black, as made commercially by the Brownlee and Uhlinger process, has a substantial stiffening effect upon rubber, although such stiffening effect is much less than that of common commercial carbon black and approximates the stiffening qualities of zinc oxide.

In said Uhlinger Patent No. 1,638,421, the characteristics of common commercial carbon black and the thermal decomposition carbon as made by the Brownlee and Uhlinger process are stated in detail and compared, and need not be here repeated.

Our new carbon black differs from both the common commercial carbon blacks and the Brownlee and Uhlinger carbon black. It has certain of the desirable qualities of both of these carbon blacks and certain additional qualities. Generally speaking, our new carbon black has the low rubber stiffening qualities of the Brownlee and Uhlinger carbon black and the apparent gravity of the common commercial carbon blacks, such as are made by the channel process. It imparts an ultimate tensile strength to rubber approximately equal to that imparted by an equal weight of the best grades of common commercial carbon black. By ultimate tensile strength is meant the tensile strength at point of rupture. It is usually calculated in pounds per square inch on the original cross section of the test piece. It imparts to the rubber a greater elongation at the point of rupture than that imparted by equal weights of either common commercial carbon black or the Brownlee and Uhlinger carbon black. A somewhat greater proportion by weight of our new carbon black may be milled into rubber and the desirable qualities of the rubber composition retained, than is the case with the Brownlee and Uhlinger carbon black.

The rubber composition in which our new carbon black is compounded therefore differs from rubber compositions as heretofore made, either with common commercial carbon blacks, or with the Brownlee and Uhlinger carbon black. Our new carbon black itself, as above described, has certain desirable characteristics which make it an improvement over the Brownlee and Uhlinger carbon black for certain purposes. These different characteristics are imparted to the black by its process of manufacture, as hereinafter described. Our preferred process resembles the Brownlee and Uhlinger process in that the hydrocarbon gas is decomposed in a retort without substantial combustion of the gas. Our process differs, however, from the Brownlee and Uhlinger process in that the hydrocarbon gas is mixed with a diluent gas.

Claims directed to the compounding of our new carbon black with rubber stocks and the rubber compositions produced thereby are presented in our U. S. Patent No. 1,794,558, granted March 3, 1931.

We will now describe in detail the manufacture of our carbon black and its characteristics.

In the drawings:

Figure 1 is an elevation taken partly in vertical section showing more or less diagrammatically the preferred apparatus for carrying out the process; and Figure 2 is a vertical section through the center of the heating retort in the plane parallel to that shown in Figure 1.

The preferred apparatus as shown is that of the general type shown in the Brownlee and Uhlinger Patent No. 1,520,115. Generally speaking, it consists of a heating retort which contains refractory checkerwork. This checkerwork is heated to a high temperature by a heating blast. The heating blast is periodically cut off and the hydrocarbon gas to be decomposed, usually natural gas, is passed through the heated checkerwork and is decomposed thereby into hydrogen and solid carbon particles. Part of the carbon particles are deposited on the checkerwork but part of them are swept along with the gas, which passes out through devices for cooling it and filtering out and recovering the entrained carbon.

Referring to the illustrated embodiment of the apparatus, reference numeral 1 indicates the heating retort in which the decomposition of the hydrocarbon gas takes place. The gas which issues from the retort and which contains the entrained carbon particles, passes through the outlet 2 into a chamber 3 into which the water spray 4 is discharged to cool the gas. The gas is highly heated and converts the water into steam, the latent heat of evaporation serving efficiently to cool the gas. The gas then passes downwardly through a column 5 and along a conveyor passage 6 into the separating chamber 7, where the gas passes through fabric bags 8, which are shaken from time to time to dislodge the carbon. The carbon from the separator 7 and the tower 5 falls into the conveyor passage 6 where it is pushed along to the right, as viewed in Figure 1, by means of the screw conveyor 9 to a bin, from which it is bagged. The general layout as above described, and particularly the means for cooling the gas and collecting the carbon black, is described in the Brownlee and Uhlinger Patent No. 1,520,115. The temperature of the cooling chamber 3 is preferably automatically thermostatically controlled, as described in the Brownlee and Uhlinger patent.

The gas from which the entrained carbon particles have been removed goes from the separator 7 into a discharge pipe 10, having two branches 11 and 12. The branch 11 leads back to the retort 1 through a gas storage tank 11a (shown diagrammatically and greatly reduced in size) and permits the hydrogen gas formed to be recirculated through the retort as the diluent gas, if desired.

The branch 12 leads off the excess hydrogen which may be utilized for any desired purpose, such as in the manufacture of ammonia, fertilizer, etc., or even for fuel. A blower 13 is provided for forcing the hydrogen gas into the retort.

The retort 1 and the reactions taking place therein will now be described in more detail.

The retort 1 has a steel plate casing 14 and a lining consisting of an inner facing 15a of firebrick and a layer 15b of insulation of refractory insulating material, such as asbestos or the porous insulating materials formed from diatomaceous earth such as a well-known trade-marked material which analyzes on ignited bases approximately 93.6% $SiO_2$, 3.7% $Al_2O_3$, 1.3% $Fe_2O_3$, 0.7% CaO, 0.6% MgO. The chamber within the retort is filled, for the most part, with checkerwork 16 made of refractory brick, usually silica brick. The checkerwork is divided into two parts or zones; first, the zone A in which the diluent gas is preheated; and second, the zone B or reaction zone in which the hydrocarbon gas is decomposed.

The checkerwork in the retort is periodically heated by a heating blast admitted through the pipe 17, at the base of the retort. A combustible gas, such for example, as natural gas, is admitted by the branch pipe 18, and air is admitted by the branch pipe 19, to the blast pipe 17 and into the space 20 at the bottom of the retort, where the gas burns and the hot products of combustion pass up through the checkerwork to heat it. During the heating blast, the products of combustion are discharged through the opening 21, having a closure valve 22, which is lifted during the heating blast, but which is closed to exclude air from the retort when the hydrocarbon gas is being decomposed. The products of combustion from the heating blast are discharged into a hood 23, and through a stack 23a through the roof of the building.

After the checkerwork 16 has been heated, the diluent gas is admitted at the top of the retort through the inlet pipes 24. It is preferred to use as the diluent gas, the gaseous products of decomposition resulting from the process after the entrained carbon has been separated. This gas consists principally of hydrogen, although it may contain a small amount of undecomposed hydrocarbon gas. The hydrogen gas is inert in the process, that is to say, it merely acts as a vehicular diluent and does not chemically react with the hydrocarbon gas being decomposed. This hydrogen gas is admitted to the inlet pipes 24 through the valves 25 from the gas tank 11a.

The diluent gas passes into the open diffusing chamber 30 in the top of the retort and down through the checkerwork zone A to the mixing chamber 31, where it meets the hydrocarbon gas to be decomposed which is introduced through the pipes 32. The hydrocarbon gas to be decomposed is usually referred to as the "run" gas in this industry. There are preferably a plurality of the gas admission pipes 32 so as to insure a thorough mixing in the chamber 31 of the hydrocarbon gas and the diluent gas. The mixed hydrocarbon gas and diluent gas then passes down through the checkerwork reaction zone B, in which the hydrocarbon gas is decomposed into hydrogen and solid particles. Part of the carbon is deposited upon the checkerwork brick, but part of it is swept along through the spaces between the checkerwork brick into the chamber 20 at the bottom of the retort and out with the effluent gas through the discharge passage 2 into the carbon-separating apparatus.

The discharge passage 2 is provided with a valve 37 which is closed during the time that the retort is being heated by the heating blast from the burner pipe 17. As shown in the drawings, the checkerwork of the zone A is spaced from the checkerwork of the zone B by supporting columns 38, so as to form a relatively unobstructed chamber 31 in which the hydrocarbon gas discharged inwardly from the plurality of inlets 32 may be quickly and thoroughly mixed with the downwardly flowing current of diluent gas. The inlets 32 are fitted with hydrocarbon supply pipes 33 and their valves 35, and with branch pipes 34 and their corresponding valves 36. The latter merely serve for the introduction of auxiliary reactants or diluents if desired. The checkerwork of zone B is likewise supported on columns 39, to leave a relatively unobstructed space 20 at the bottom of the retort.

Branch pipes 26, controlled by valves 28 are shown at the top of the retort. This branch pipe is not normally used, but may be used in a modification of the process referred to later in this specification, to admit hydrocarbon gas to the top of the retort. Additional branch pipes 27 with their corresponding valves 29 are also illustrated in the drawings. These merely serve as entrance ports for auxiliary reactants or diluents if desired.

The preferred operation of the apparatus is as follows:

The checkerwork is first heated by applying a heating blast through the burner pipe 17. During this heating blast the valves 25, 28, 29, 35, 36 and 37 are all closed to shut off the retort from the gas admission supplies and from the carbon-collecting portion of the apparatus. The valves 18a and 19a in the pipes 18 and 19 are open to admit a combustible mixture of gas and air through the burner pipe 17. The valve 22 is open wide to allow the gases of combustion to pass off into the stack. The heating blast is maintained until the checkerwork is heated to the desired temperature. The checkerwork in the zone B is heated to a preferred temperature of about 1200 to 1400° C. The lower portion of the checkerwork in zone A is heated to about this temperature, although the upper portion of the zone A need not be heated quite as high. An excess of air is supplied to the heating blast so that it has an oxidizing effect to clean the checkerwork by burning off the carbon deposited thereon. The combustion of this carbon of course furnishes heat.

After the checkerwork has been heated sufficiently, the blast is shut off and the cap valve 22 is closed, the outlet valve 37 is opened, the valves 25 are opened to admit the diluent gas at the top of the retort, and the valves 35 are opened to admit the hydrocarbon or run gas into the mixing chamber 31. The diluent gas flowing down through the heating zone A is highly preheated to a temperature well above the decomposition temperature of the hydrocarbon gas. The volume of the diluent gas is preferably in excess of that of the hydrocarbon gas, so that the sensible heat of the inert diluent gas immediately raises the temperature of the hydrocarbon gas in the mixing chamber 31 above the decomposition point. This mixture then passes rapidly down through the reaction checkerwork zone B in which the decomposition of the hydrocarbon gas takes place. The hydrocarbon gas is decomposed wholly or nearly completely into hydrogen and solid carbon particles. Part of the carbon becomes deposited on the checkerwork, while the remainder of it is swept along by the effluent gas through the outlet 2 and is recovered.

The decomposition of the hydrocarbon gas into hydrogen and carbon particles is apparently a surface phenomenon. The decomposition apparently takes place, or takes place initially, at the highly heated surfaces of the refractory checkerwork, and the carbon particles so formed are partly lodged upon the checkerwork and are partly swept along and entrained in the stream of gas.

In order to secure an adequate yield of carbon, the zone in which the hydrocarbon gas is decomposed should contain extensive hot contact surfaces. In the form of retorts illustrated, such surfaces are provided by the checkerwork. We use the word "checkerwork" as a term of general description and not of limitation, and intend to include under such term materials of any shape, whether in the form of regular brick or not, so placed in the retort chamber as to expose extended surfaces with passages between them to permit the flow of the gas. We use the word "checkerwork" to distinguish such a construction on the one hand from an open chamber in which the only surface presented is that of the chamber walls which is so small that but little decompositions of the hydrocarbon gas would result, and on the other hand from beds of granular material in which the pieces of material and the passages between them are so small that the carbon would be practically all caught in the bed of material and could not be recovered.

Other specific forms of extensive heated contact surfaces may be provided in whole or in part by a heat-resisting metal structure, although we prefer to use refractory bricks, such as silica or silicon carbide brick, in a retort like that illustrated, in which the heating blast is periodically applied through the reaction zone.

We have found that for the best results, the hydrocarbon gas should be quickly and thoroughly mixed with the preheated diluent gas and then the mixture rapidly swept through the checkerwork reaction zone B. If the hydrocarbon gas is slowly heated, such for example, as would occur if the diluent gas were unheated or if the hydrocarbon gas were slowly mixed with a preheated diluent gas, objectionable compounds, such as naphthalene would be formed. The hydrocarbon gas would begin to decompose, but instead of decomposing quickly and entirely into carbon and hydrogen, which occurs upon quick heating, the gas would decompose partly into oily intermediate compounds. It is therefore preferred to highly preheat the diluent gas and quickly mix it with the hydrocarbon gas. The high preheating of the diluent gas also allows a minimum of checkerwork to be used in the reaction zone B, and there is therefore less surface in the reaction zone B to catch the carbon than would be the case if the gas were delivered to the zone B at a lower temperature and had to be heated by the zone B. The checkerwork in the zone B can therefore be limited to that practically necessary to furnish a sufficient surface for the surface action in decomposing the gas.

The hydrocarbon gas, which is less in volume than the diluent gas, may or may not be preheated. Ordinarily the volume of the diluent gas is sufficient so that upon mixing in the chamber 31, the temperature of the resultant mix is well above the decomposition point of the hydrocarbon gas. The gas raised to this temperature is therefore in condition to be immediately decomposed by what is apparently the surface contact action of the extensive hot contact surfaces in the reaction zone B. The volume of diluent gas is preferably in excess of the hydrocarbon gas, the volumes of the gases being computed, of course, at the same temperature for purposes of comparison. The volume of the diluent gas is preferably at least twice that of the hydrocarbon gas. Usually the ratio of volume of diluent gas to hydrocarbon gas is about three or four to one. The volume of diluent gas may be increased above this proportion without materially altering the character of the carbon, but for motives of economy, a volume of diluent gas greater than necessary should not be used. We prefer to use a dilution ratio of not over about six volumes of diluent gas to one volume of hydrocarbon gas, although such ratio may be exceeded without spoiling the carbon. We have found that if the volume of diluent gas be reduced below about twice that of the hydrocarbon gas, the carbon will grade off with the reduction in volume of the diluent gas toward the characteristics of the carbon made by the Brownlee and Uhlinger process in which no diluent gas is used.

The presence of the large volume of diluent gas profoundly modifies the carbon from that produced by the Brownlee and Uhlinger process, or that which would be produced by a process in which but a relatively small amount of diluent gas might be used. When a hydrocarbon gas, such as natural gas, is decomposed in a retort as in the Brownlee and Uhlinger process, a carbon black is produced which we designate herein by the term Brownlee and Uhlinger carbon black and which is of a grayish cast and which contains a larger proportion of large carbon particles than our carbon black. The same would be true if a relatively small amount of a diluent gas were mixed with the hydrocarbon gas. These large carbon particles apparently persist as such when the carbon is milled into rubber or other media. The carbon particles as initially formed at the contact surfaces in the Brownlee and Uhlinger process are in an environment rich in hydrocarbon and they apparently serve as decomposition centers or nucleii which grow in size due to further decomposition of the hydrocarbon gas.

When the hydrocarbon gas is sufficiently diluted, as in our process, the carbon particles as initially formed upon the contact surfaces are in an environment in which the molecules of the hydrocarbon gas are well dispersed in the diluent so that the carbon particles do not have the same opportunity to grow in size.

The extensive hot contact surfaces afforded by the checkerwork speed up the decomposition of the hydrocarbon gas and allow it to proceed rapidly at a temperature practically obtainable in a retort. If an attempt were made to decompose the hydrocarbon gas by mixing it with a highly preheated diluent gas without extensive hot contact surfaces, but little decomposition of the hydrocarbon gas would result within a practicable time. Moreover, a temperature which would be destructive of the ordinary refractories would be required to get any substantial decomposition at all without the contact surface action.

For efficient and rapid decomposition of a hydrocarbon gas into a carbon black having the characteristics of our carbon black, it seems to be necessary that extensive hot contact surfaces be provided to accelerate the decomposition of the hydrocarbon gas, and that the carbon particles so formed be surrounded with a well diluted gaseous mixture which will sweep the carbon particles from the contact surfaces and into the cooling apparatus without allowing them to grow unduly large or change in color.

The diluent gases flowing down through the checkerwork zone A into the mixing chamber 31 can have a temperature no higher than that of the checkerwork. The addition of the hydrocarbon gas to be decomposed lowers the temperature of the gaseous mixture in the mixing chamber 31, which flows through the reaction zone B. This reduction in temperature depends upon the dilution ratio.

Assuming that the gases emerging from the bottom of the checkerwork zone A have a temperature of about 1400° C. and assuming a dilution ratio of one part of the hydrocarbon gas at room temperature to three parts of such diluent gas, a calculation based solely upon the cooling effect of this volume of hydrocarbon gas upon the diluent gas indicates that the temperature of the mixture would be in the neighborhood of 1050° C. Moreover, the reaction whereby the hydrocarbon gas is decomposed into carbon and hydrogen is endothermic, thus further tending to cool the mixture.

At temperatures which are practically obtainable for the mixture, the rate of decomposition of the hydrocarbon gas, without the use of hot contact surfaces, would be entirely too slow for practical operation. Because of the money invested, the decomposing retorts must be worked at a fairly high capacity. Therefore, the stream of gas must flow rapidly through any commercial gas decomposing retort. Moreover, if the carbon once formed remains in the heated retort too long, it tends to become coarse or graphitic in texture and gray in color. It is therefore desirable, both for economy in operation and for attaining the desired product, to speed up the decomposing reaction by the use of extensive hot contact surfaces.

These hot contact surfaces have the dual function of bringing up the mixture formed by the preheated diluent gas and the cold hydrocarbon gas to the proper operating temperature and supplying heat to maintain the endothermic decomposing reaction, and of exerting the so-called catalytic or surface action in speeding up the decomposing reaction at the operating temperature.

The diluent gas preferably consists principally of inert gas and by "inert gas", we mean a gas which will not chemically combine with the hydrocarbon gas or the carbon particles entrained in the gas to any substantial extent, as by combustion. The recirculated effluent gas resulting from the process, and which consists principally of hydrogen, is preferably used as the diluent gas, since it is inert and is readily available as a by-product. Moreover, the effluent gas as it leaves the retort is not entirely decomposed, and while it consists principally of hydrogen, it usually contains a small amount of undecomposed hydrocarbon gas. When this gas is again recirculated as a diluent gas, the residual undecomposed hydrocarbon gas again goes through the retort and is further decomposed, thus giving the maximum recovery from the original hydrocarbon gas. Also, when the excess hydrogen is taken off, as through the branch discharge pipe 12, and utilized as hydrogen, it is advantageous to use the effluent gas as a diluent, since the excess hydrogen taken off through the discharge pipe 12 will not be contaminated by other gases. However, other gases may be employed as the diluent gas, preferably inert gases, such as nitrogen.

While in the original dilution process, as developed by us and described as the preferred practice in this application, the cooled hydrogen-containing diluent gas is piped back and reheated by passing it through highly heated checkerwork, the diluent gas might be otherwise heated before it is mixed with the hydrocarbon gas to be decomposed.

The hydrocarbon gas to be decomposed is preferably natural gas which can be secured cheaply, particularly from wells which are distant from industrial centers. The natural gas consists principally of methane. However, other hydrocarbon gases may be used, such for example, as still gas from the petroleum-refining industry, casing head gas, a gasified or vaporized oil, gases made from coal, etc.

As above described, the usual preferred procedure is to highly preheat the diluent gas and then quickly and thoroughly mix it with a hydrocarbon gas and pass the resultant mixture rapidly through a hot checkerwork reaction zone. This results in the carbon having the characteristics hereafter more fully described and which we designate herein as "our new carbon black".

The process may be modified and still a carbon produced having the desirable characteristics, by mixing the diluent gas and hydrocarbon gas before heating. For example, instead of admitting the hydrocarbon gas through the pipes 32, the hydrocarbon gas may be admitted through the branch pipes 26 into the diluent gas which passes into the top of the retort. The current of cold mixed gas then passes down through the entire column of checkerwork in the retort. This procedure gives, of course, the large volume of diluent gas and maintains the black color and lesser weight per unit volume of the carbon. There is, however, a greater tendency for a lowered production of carbon, since in order to heat up the gases, they must be passed through a greater amount of checkerwork than the mixture is passed through when the hydrocarbon gas is mixed with the preheated diluent gas, with the consequently greater chance of the carbon becoming encrusted upon the checkerwork and thus lost.

Having described the process of producing our new carbon black, we will now describe its characteristics with particular reference to those of the usual commercial carbon blacks, such as the channel blacks, on the one hand, and to those of the Brownlee and Uhlinger carbon black on the other hand.

Our new carbon black resembles common commercial carbon black in the following particulars:

1. It is a very finely divided fluffy black powder consisting of particles or aggregates, or both, a large percentage of which are submicroscopical in size. The average particle size appears to be somewhat larger than that of common commercial carbon black but much smaller than that of the Brownlee and Uhlinger carbon black, being approximately $0.159\mu$, as compared to $1.12\mu$ for the Brownlee and Uhlinger carbon black, $0.061\mu$ for a rubber black prepared by the channel process, and $0.025\mu$ for a pigment black prepared by the channel process. (Determined by the procedures described by Gehman and Morris, J. Ind. & Eng. Chem. (Analytical Edition) 4, pp. 157–162.)

2. It has approximately the same apparent gravity or bulking value, namely 12 to 25 pounds per cubic foot. Expressed in slightly different terms, the apparent density of our new carbon black in grams per c. c. is approximately 0.37, as compared to 0.65 for the Brownlee and Uhlinger carbon black, 0.26 for a rubber black prepared by the channel process, 0.11 for a pigment black prepared by the channel process, and 0.12 for the carbon black prepared according to the process of Goodwin U. S. Patent 1,758,151. Apparent density is determined by filling a container with the carbon black, tapping the container so as to fill it as completely as possible, weighing the thus filled container and then comparing the weight of this volume of carbon with the weight of an equal volume of water.

3. It has the same specific gravity in media, such as oils and rubber, namely, 1.75 to 1.79.

When incorporated into rubber in suitable proportions, the ultimate tensile values of the cured compounded stock are practically the same as those of a rubber stock containing an equal proportion by weight of common commercial rubber black produced by the channel process, being approximately 5000, as compared to approximately 4000 for the Brownlee and Uhlinger carbon black and approximately 3000 for a pigment black produced by the channel process, using a formula containing 100 parts smoked sheet rubber, 40 parts carbon, 5 parts zinc oxide, 3.5 parts sulphur and 1.25 parts diphenyl guanidine.

The color of our carbon as seen by the eye is practically black, as contrasted with the distinct grayish cast of the Brownlee and Uhlinger carbon. Under certain conditions, a slight tendency toward a grayish black as distinguished from a jet black may be noticed. In degree of blackness, its color is much closer to the channel blacks than it is to the Brownlee and Uhlinger carbon. In order to remove as much as possible the human equation from the determination of the tinting strength of our carbon black, a standard sample of the same has been compared with a standard channel black using a Keuffel and Esser color analyzer. This spectrophotometer was used to determine the brightness of various tints of each in order to eliminate inaccuracies due to difference in undertone. The spectrophotometer separates the light reflected from the surface of the sample being tested into a visible spectrum and enables the observer to determine the brightness of the light emanating from the surface being tested relative to that from a standard white at various different wave lengths throughout the visible spectrum. In using this color analyzer, the standard with which comparisons for brightness are made is the surface of a block of pure magnesium carbonate; and the technique employed is that recommended by Keuffel and Esser.

A master paste was made up of our new carbon black and another master paste of a standard commercial rubber black produced by the channel process, these pastes being made from the specified carbon, zinc oxide (XX grade) and pale yellow raw linseed oil. In each case, one part by weight of carbon, five parts zinc oxide and sufficient weighed oil were used to make a paste of the desired consistency, the whole being thoroughly and carefully mixed with a spatula on a glass plate in such a manner as to insure dispersion and homogeneity. Portions of each master paste were toned down by the addition of zinc oxide and more oil to obtain tints of the desired concentrations (ranging from the pure carbon to the pure zinc oxide).

For example, it was desired to make a paste containing three parts by weight of our new carbon black per 100 parts of zinc oxide. A small portion of the master paste of our new carbon black (containing 12.79% carbon) was found to weigh .2997 grams. This contained .03828 grams of carbon and five times as much zinc oxide. 1.0846 grams of zinc oxide were added, together with .21 grams of linseed oil, this being the amount of oil necessary to give a paste of the proper consistencey to disperse the pigment.

The master pastes were pressed out between carefully selected glass microscope slides, and spectrophotometric determinations made of the percentage brightness relative to standard magnesium carbonate at various wave lengths by means of the color analyzer. The data were reduced to terms of percentage brightness relative to standard noon sunlight according to the method outlined by Keuffel and Esser.

The concentration of channel black necessary to produce a brightness equal to that of a paste containing 2.5 parts by weight of our new carbon black per 100 parts of zinc oxide was obtained with the aid of a graph plotted with the logarithm of the brightness against the logarithm of the concentration of the carbon in parts per hundred parts of zinc oxide plus carbon.

From this the tinting strength of our new carbon black relative to the channel black at this particular concentration was calculated as the number of parts by weight of the channel black per 100 parts of our new carbon black necessary to produce equal brightness when added to equal amounts of zinc oxide.

In testing the product of the checkerwork apparatus disclosed herein, it has been found that from time to time the tinting strength of the carbon black varies. Tinting strength, as the term is used herein, and as ordinarily used in this art, is defined as follows, in accordance with the definition approved by the American Society for Testing Materials: "The power of coloring a given quantity of paint or pigment selected as a medium standard for estimating such power."

Tests were made from time to time as above mentioned; and, in general, the method outlined in the Bureau of Mines Bulletin No. 192, 1922, "Carbon Black—Its Manufacture, Properties, and Uses", by R. O. Neal and G. St. J. Perrott, on page 62, was followed, zinc oxide-linseed oil paint being tinted with the carbon black being tested. In testing, the black which has come from the checker-work apparatus has customarily been compared with the standard prepared from our carbon black above mentioned. Pastes of our standard carbon black were made with a concentration of 2.5 parts by weight of carbon per 100 parts of zinc oxide. In making the test, the carbon black being tested is mixed with standard zinc oxide and refined linseed oil. The concentration of the carbon black being varied in successive pastes until, when spread in a thin film on a mircroscope slide beside a film of our standard carbon black paste, a match is obtained. The tinting strength of our standard carbon black, relative to channel black having been determined with the aid of the color analyzer, the variation in the tinting strength of the product of the checker-work apparatus relative to our standard carbon black determined by means of these color slides gives an accurate index of the variation in the tinting strength of our new carbon black from time to time relative to channel black. These tests show that from certain checkerwork apparatus the variation in tinting strength, when samples are compared with a paste having a concentration of 2.5 parts by weight of our standard carbon black per 100 parts of zinc oxide, is from 42 to 48% relative to a standard commercial rubber black produced by the channel process. The range may extend from as low as 40% to as high as 50% for this particular concentration. It has been found that the tinting strength of the Brownlee and Uhlinger carbon black, determined similarly, ranges from 13 to 15% relative to a standard rubber black produced by the channel process and may range from as low as 12 to 16% for this particular concentration of carbon black. Expressed in terms of the Brownlee and Uhlinger carbon black as a standard, by a recalculation of the above figures by simple proportion, the tinting strength of our new carbon black may be expressed as 250% to 400% that of the Brownlee and Uhlinger carbon black.

Our new carbon black differs from common commercial carbon black in the following particulars:

1. It mills into rubber much more quickly and easily.

2. Uncured rubber stocks containing our new carbon black in 20 volume loadings are not nearly so stiff as those containing an equal weight of common commercial rubber black produced by the channel process, having a modulus at 500% elongation of approximately 2000, as compared to approximately 1800 for the Brownlee and Uhlinger carbon black, 3000 for common commercial rubber blacks produced by the channel process, and 3900 for the carbon black of the Goodwin patent referred to above, when compared at optimum cures, in a formula containing 100 parts smoked sheet rubber, 40 parts carbon, 5 parts zinc oxide, 3.5 parts sulphur and 1.25 parts diphenyl guanidine.

3. Cured rubber stocks containing our new carbon black have a much greater elongation before rupture than those containing an equal proportion by weight of common commercial rubber blacks produced by the channel process.

4. Our new carbon black has a much lower oil absorption than common commercial carbon black, the oil absorption number being usually less than 100, and generally being between 35 and 50 c. c. of refined linseed oil per 100 grams of carbon, this being the minimum amount of oil which will give a coherent mass without much staining of the glass plate when the mixture is well kneaded with a stiff spatula. A satisfactory grade of our carbon black as commercially produced will have an oil absorption number of approximately 40 or slightly lower.

5. Our new carbon black slightly accelerates the rate of cure of rubber compounds, whereas most common commercial carbon blacks do not accelerate the cure and usually retard it.

6. Much larger proportions of our new carbon black may be milled into rubber advantageously than is the case with common commercial carbon blacks. The maximum reinforcement of rubber by common commercial carbon black is reached with proportions of approximately twenty volumes of carbon black to one hundred volumes of rubber. (See William B. Wiegand's "The Resilient Energy Criterion", Industrial and Engineering Chemistry, vol. 17, p. 623, 1925). The maximum reinforcement is reached with our new carbon black at about thirty volumes of our carbon black to one hundred volumes of rubber. Furthermore, as the proportions of common commercial carbon black are increased over twenty volumes per one hundred volumes of rubber, the desirable properties of the rubber stock fall off very rapidly and the stock becomes too stiff to be useful. On the other hand, as much as forty volumes of our new carbon black may be added to one hundred volumes of rubber without any serious deterioration of the quality. Useful stocks have been made with as much as forty volumes of our new carbon black and thirty-five volumes of other constituents, a total of seventy-five volumes, to one hundred volumes of rubber, a result quite impossible in the case of common commercial carbon black.

The maximum amount of carbon which may be milled into a rubber stock affords still another method of distinguishing our new carbon black from other forms of carbon black. In determining the maximum loading volume values of carbons the usual procedure is to take 400 grams of clean smoked sheets and break them down by milling for 5 minutes at a rolling temperature of 140-150° F. on a 12" mill run by a 7.5 H. P. motor. The carbon under investigation is then added as rapidly as the rubber will take it and until the rubber begins to break up. Under these conditions approximately 150 volumes of our new carbon black may be milled into 100 volumes of rubber, as compared to 59.3 volumes of a rubber black produced by the channel process, 62.9 of the carbon black of the Goodwin patent referred to above and approximately 185 of the Brownlee and Uhlinger carbon black.

Our new carbon black resembles the Brownlee and Uhlinger carbon as follows:

1. Our new carbon black has about the same low oil absorption as the Brownlee and Uhlinger carbon black, namely, an oil absorption number usually below 100 and generally about 35 or 50, and therefore, it increases the viscosity of an oil vehicle approximately the same amount as the Brownlee and Uhlinger carbon black. As a general rule, its oil absorption number will be slightly higher, say 5 to 10 points, than that of corresponding grades of the Brownlee and Uhlinger carbon black.

2. On a 20 volume loading basis, the modulus at 500% elongation of our new carbon black is approximately equal to that of an equal volume loading of the Brownlee and Uhlinger carbon black, and approximately two-thirds that of an equal volume loading of a common commercial rubber black produced by the channel process, when compared at optimum cures.

3. Our new carbon black mills into rubber about as easily and quickly as the Brownlee and Uhlinger carbon black.

4. Our new carbon black has approximately the same specific gravity as the Brownlee and Uhlinger carbon black in media, such as rubber and oils.

Our new carbon black differs from the Brownlee and Uhlinger carbon black in the following particulars:

1. Our new carbon black is generally grayish black in color, but is decidedly blacker than the Brownlee and Uhlinger carbon black which is a dark gray (for a more detailed comparison, reference may be had to the data given above).

2. Our new carbon black weighs from 12 to 25 pounds per cubic foot, whereas the Brownlee and Uhlinger carbon black weighs from 25 to 35 pounds per cubic foot.

3. Our new carbon black imparts an ultimate tensile strength to cured rubber compounds equivalent to that of similar compounds containing an equal weight of the best varieties of common commercial rubber blacks produced by the channel process, whereas similar compounds containing an equal weight of the Brownlee and Uhlinger carbon have a lower ultimate tensile strength, when compared at optimum cures.

4. Rubber compounds containing our new carbon black have a much greater elongation at the point of rupture, a much higher resilient energy at the point of rupture, (or proof resilience as termed by Wiegand supra), and a much greater resistance to tear, than similar compounds containing an equal weight of the Brownlee and Uhlinger carbon black, when compared at optimum cures.

5. Much higher proportions of our new carbon black may be advantageously used in rubber compounds than can be employed in the case of the Brownlee and Uhlinger carbon.

The stiffness of rubber as the term is used above and as ordinarily used in this art is measured in terms of the load at a given elongation of a test piece. This is commonly measured by determining the load in pounds per square inch of rubber, calculated on the original cross section of the test piece, that is necessary to stretch the test piece to six times its original length.

The oil absorption is usually measured by the well-known Gardner test in which a refined linseed oil is mixed with the carbon black in such proportions that the mass may be rolled into a ball and begin to smear a clean smooth glass or porcelain surface. The number of cubic centimeters of the oil required to be mixed with 100 grams of carbon black is taken as the oil absorption number.

Our new carbon black is useful as a pigment due to its high covering power. Our new carbon black is also useful for various other purposes.

As can be seen from the foregoing description, our new carbon black is particularly valuable for compounding in rubber stocks.

It may be incorporated in the usual way in which the carbon blacks are incorporated in rubber, namely, by milling the carbon black into the raw rubber. The rubber thus compounded is cured or vulcanized in the usual way. The rubber compositions having our new carbon black incorporated or compounded therein have certain characteristics distinguishing them from rubber compositions compounded with common commercial carbon black or with the Brownlee and Uhlinger carbon black. In referring to the characteristics of rubber compositions containing our new carbon black or rubber compounded with our new carbon black, we intend to refer to the rubber compositions or compounds in their cured state. A rubber composition containing our new carbon black has approximately the same ultimate tensile strength as a rubber composition containing an equal weight of common commercial carbon black, but is not so stiff as a rubber so compounded. Rubber compositions containing our carbon black combine the two desirable characteristics of the ultimate tensile strength imparted by common commercial carbon black and the lessened stiffness imparted by the Brownlee and Uhlinger carbon black. Rubber compositions containing our new carbon black have a greater elongation at point of rupture than rubber compositions containing the same weight of either common commercial carbon black or the Brownlee and Uhlinger carbon black. Rubber compositions containing our new carbon black have higher resilient energy at rupture and a greater resistance to tear than rubber compounded with an equal weight of the Brownlee and Uhlinger carbon black. A rubber composition may contain a much larger proportion of our new carbon black without losing its desirable qualities than is possible with either the common commercial carbon blacks or the Brownlee and Uhlinger carbon black.

The Brownlee and Uhlinger carbon black known as "Thermax" has been described in detail herein and is more completely described in the Brownlee and Uhlinger patents herein referred to. This carbon black, which has been utilized as a standard of comparison for the description of our new carbon black "P-33", is referred to in the appended claims as "the herein described thermal decomposition carbon black of the type prepared in the absence of substantial concentrations of diluent gases".

While we have described in detail the preferred embodiments of our invention and the preferred process of operation, it is to be understood that the invention is not so limited, but may be otherwise embodied and practiced within the scope of the following claims.

We claim:

1. As a new article of manufacture, a carbon black, identified by the following combination of physical characteristics; (1), having a weight when uncompressed between 12 to 25 pounds per cubic foot; (2), an oil absorption number of from 35 to 50 c. c. of refined linseed oil per 100 grams of carbon by the Gardner method; and (3), the property of imparting to rubber when incorporated therewith as a reinforcing agent an ultimate tensile strength of the order of 5000 and a modulus of the order of 2000 at 500% elongation, in a formula consisting of 100 parts smoked sheet rubber, 40 parts carbon, 5 parts zinc oxide, 3.5 parts sulphur and 1.25 parts diphenyl guanidine.

2. As a new article of manufacture, a carbon black, identified by the following combination of physical characteristics; (1), having a weight when uncompressed between 12 to 25 pounds per cubic foot; (2), an oil absorption number of from 35 to 50 c. c. of refined linseed oil per 100 grams carbon by the Gardner method; and (3), having the characteristic of imparting to rubber, when compounded therewith as a reinforcing agent, a modulus of the order of 2000 at 500% elongation at optimum cure in a formula consisting of 1000 parts smoked sheet rubber, 40 parts carbon, 5 parts zinc oxide, 3.5 parts sulphur and 1.25 parts diphenyl guanidine.

3. As a new article of manufacture, a carbon black, identified by the following combination of physical characteristics; (1), having a weight when uncompressed between 12 to 25 pounds per cubic foot and (2), an oil absorption number of from 35 to 50 c. c. of refined linseed oil per 100 grams of carbon by the Gardner method.

4. As a new article of manufacture, a carbon black, identified by the following combination of physical characteristics; (1), an oil absorption number of 35 to 50 c. c. of refined linseed oil per 100 grams of carbon by the Gardner method; (2), an apparent density of the order of 0.37; (3), having a maximum volume loading value in rubber when compounded therewith as a reinforcing agent of in excess of 100, but not substantially in excess of 150; and (4) the property of imparting to rubber when incorporated therewith as a reinforcing agent an ultimate tensile strength of the order of 5000 and a modulus of the order of 2000 at 500% elongation, in a formula consisting of 100 parts smoked sheet rubber, 40 parts carbon, 5 parts zinc oxide, 3.5 parts sulphur and 1.25 parts diphenyl guanidine.

5. As a new article of manufacture, a carbon black, identified by the following combination of physical characteristics; (1), an oil absorption number of from 35 to 50 c. c. of refined linseed oil per 100 grams of carbon by the Gardner method; (2), an apparent density of the order of 0.37; and (3), having a maximum volume loading value in rubber when compounded therewith as a reinforcing agent of in excess of 100, but not substantially in excess of 150.

6. As a new article of manufacture, a carbon black, identified by the following combination of physical characteristics; (1), an oil absorption number of from 35 to 50 c. c. of refined linseed oil per 100 grams of carbon by the Gardner method; (2), a tinting strength at a concentration of 2.5 parts by weight of carbon black per 100 parts of zinc oxide of from 250% to 400%, using as a standard of comparison the herein described Brownlee and Uhlinger thermal decomposition carbon black; and (3), having a maximum loading volume value in rubber when compounded therewith as a reinforcing agent of in excess of 100, but not substantially in excess of 150.

7. As a new article of manufacture, a carbon black, identified by the following combination of physical characteristics; (1), having a tinting strength at a concentration of 2.5 parts by weight of carbon black per 100 parts of zinc oxide of from 250% to 400%, using as a standard of comparison the herein described Brownlee and Uhlinger thermal decomposition carbon black; (2), an oil absorption number of from 35 to 50 c. c. of refined linseed oil per 100 grams of carbon by the Gardner method; and (3), having a weight when uncompressed between 12 to 25 pounds per cubic foot.

8. As a new article of manufacture, a carbon black, identified by the following combination of physical characteristics; (1), having a tinting strength at a concentration of 2.5 parts by weight of carbon black per 100 parts of zinc oxide of from 250% to 400%, using as a standard of comparison the herein described Brownlee and Uhlinger thermal decomposition carbon black; and (2), an oil absorption number of from 35 to 50 c. c. of refined linseed oil per 100 grams of carbon by the Gardner method.

9. As a new article of manufacture, a carbon black, identified by the following combination of physical characteristics; (1), having a tinting strength at a concentration of 2.5 parts by weight of carbon black per 100 parts of zinc oxide of from 250% to 400%, using as a standard of comparison the herein described Brownlee and Uhlinger thermal decomposition carbon black; (2) an oil absorption number of from 35 to 50 c. c. of refined linseed oil per 100 grams of carbon by the Gardner method; (3), an apparent density of the order of 0.37; (4), having the maximum loading volume value in rubber when compounded therewith as a reinforcing agent of in excess of 100, but not substantially in excess of 150; and (5), the property of imparting to rubber when incorporated therewith as a reinforcing agent an ultimate tensile strength of the order of 5000 and a modulus of the order of 2000 at 500% elongation, in a formula consisting of 100 parts smoked sheet rubber, 40 parts carbon, 5 parts zinc oxide, 3.5 parts sulphur and 1.25 parts diphenyl guanidine.

10. As a new article of manufacture, a carbon black, identified by the following combination of physical characteristics; (1), having a tinting strength at a concentration of 2.5 parts by weight of carbon black per 100 parts of zinc oxide of from 250% to 400%, using as a standard of comparison the herein described Brownlee and Uhlinger thermal decomposition carbon black; (2) an oil absorption number of from 35 to 50 c. c. of refined linseed oil per 100 grams of carbon by the Gardner method; and (3), an apparent density of the order of 0.37.

11. As a new article of manufacture, a carbon black, identified by the following combination of physical characteristics; (1) an apparent density of the order of 0.37; and (2), having a maximum loading value in rubber when compounded therewith as a reinforcing agent of in excess of 100, but not substantially in excess of 150.

ELLWOOD B. SPEAR.
ROBERT L. MOORE.